United States Patent [19]
Eccles

[11] Patent Number: 5,117,359
[45] Date of Patent: May 26, 1992

[54] SYSTEM AND METHOD FOR DETECTION OF MICROBURSTS BY MEASURING VARIOUS WEATHER CONDITION PARAMETERS AT BOTH SPACED TIME AND LOCATION INTERVALS

[75] Inventor: Peter J. Eccles, Falls Church, Va.

[73] Assignee: The Mitre Corporation, Bedford, Mass.

[21] Appl. No.: 470,385

[22] Filed: Jan. 26, 1990

[51] Int. Cl.⁵ .............................................. G01W 1/10
[52] U.S. Cl. ...................................... 364/420; 342/26; 340/968
[58] Field of Search .................. 364/420; 340/870.09, 340/870.11, 949, 963, 968, 601, 602; 342/26

[56] References Cited

U.S. PATENT DOCUMENTS

| | | | |
|---|---|---|---|
| 4,012,713 | 3/1977 | Greene et al. | 364/420 |
| 4,034,194 | 8/1977 | Tanner | 364/420 |
| 4,143,547 | 3/1979 | Balser | 364/420 |
| 4,881,219 | 11/1989 | Jacquel | 364/420 |

FOREIGN PATENT DOCUMENTS

| | | |
|---|---|---|
| 0234097 | 3/1986 | Fed. Rep. of Germany . |
| 0076791 | 5/1983 | Japan . |

OTHER PUBLICATIONS

"Computer-Monitored Weather Station", Peter Ruttn, Elec. System News, Spring 1988, pp. 22-25.
"Automated Data Acquisition from a Health Weather Station", Intelligent Instr. & Comp. Jul./Aug. 1986, pp. 184-194.
Sparks et al., "Micros in Control-On-Lin Weather Data Acquisition Using a BBC Microcomputer".

*Primary Examiner*—Gail O. Hayes
*Attorney, Agent, or Firm*—Wolf, Greenfield & Sacks

[57] ABSTRACT

The invention comprises a microburst detection and measurement system having a plurality of SENSTRANS units positioned at spaced intervals, each SENSTRANS unit monitoring humidity, wind speed, wind direction, barometric pressure, and temperature. The sensors transmit the observed weather conditions to a central data processing and display unit via RF, FM transmission. The data processing and display unit collects and assimilates the data to determine if the measured parameters indicate the likely presence of microburst or other weather hazards. If so, it issues a weather hazard warning both visually and audibly.

29 Claims, 3 Drawing Sheets

SYSTEM AND METHOD FOR DETECTION OF MICROBURSTS BY MEASURING VARIOUS WEATHER CONDITION PARAMETERS AT BOTH SPACED TIME AND LOCATION INTERVALS

FIELD OF THE INVENTION

The present invention relates to a system for detecting and measuring microbursts and other wind shear hazards. More particularly, the invention relates to a downburst/microburst detection and measurement system comprising an array of sensors and a data processing unit for collecting and assimilating the data to determine the likely presence and strength of microbursts and other wind shear hazards.

BACKGROUND OF THE INVENTION

Wind shear caused by microbursts or other weather conditions in the vicinity of airports is extremely hazardous to aircraft during takeoff and landing. While wind shear can be dangerous at any altitude, it is particularly dangerous during takeoff and landing because the aircraft is close to the ground and cannot afford to lose altitude.

Microbursts are a principal cause of wind shear hazards. A microburst is a stream of rapid moving, downwardly directed air. The air within a microburst is cooling rapidly due to drop evaporation and possibly melting hail, both of which maintain a negative buoyancy of the air which propels it towards the ground. Microbursts are always associated with clouds and principally with severe convective storms, though microbursts have been observed after virga-like precipitation. Microbursts are typically elliptical in shape and initiate relatively high in the atmosphere. They can have a cross section of up to ten kilometers or more at higher altitudes, however, the rapid downward acceleration of the air typically causes the microburst to become narrower as it approaches the ground so that it may have a cross-section of less than one kilometer near the ground. When the air in a microburst strikes the ground, the air scoots out horizontally in a diverging pattern from the center (or nadir) of the microburst.

Due to the divergent horizontally moving air close to the ground, an aircraft encountering a microburst during takeoff or landing, first experiences a strong headwind, which increase lift, rapidly followed by a strong tailwind, which reduces lift by reducing the relative air speed of the aircraft. A significant loss of altitude can occur which, depending on the altitude of the aircraft, can cause a crash.

Due to the severe hazards possible when aircraft encounter microbursts during takeoff and landing, it is desirable to detect the presence of microbursts and other wind shear hazards around airports. One system in common use, known as the Low Level Wind shear Alert System (LLWAS), consists of an array of wind sensors in and near an airport with approximately 2.5 kilometers or less between adjacent sensors. LLWAS uses cup anemometers and wind direction sensors to sense changes in wind vectors. However, as will be explained in greater detail herein, wind speed and direction alone are not accurate indicators of microbursts.

Another system in common use utilizes scanning Doppler weather radar which can detect and track air masses. Although it is believed that Doppler radar systems are more accurate in detecting microbursts and other wind shear hazards than LLWAS, such systems are large and expensive to implement. Further, wind shear phenomena can appear suddenly, e.g., within the time it takes for the radar to complete a scan and process the received signals. Also, currently used LLWAS and, to a lesser extent, Doppler radars issue wind shear alerts when there is in fact no wind shear. As a result, pilots frequently choose to fly through reported wind shear hazard areas despite the warning. However, in response to the warning, pilots tend to increase air speed so as to reduce the likelihood of stalling if a wind shear is, in fact, present. Of course, increased air speed during landing itself presents additional safety hazards.

One proposed Doppler radar system employs a non-scanning, fixed radar positioned adjacent a runway and directed towards the glide path. Although, in such a fixed radar system, individual radars an signal processing units are significantly less costly than for scanning radar systems, in order for a fixed radar to be reliable, there must be a radar positioned adjacent every runway. Therefore, fixed Doppler radar systems are also costly.

Therefore, it is an object of the present invention to provide a low cost, accurate system for detecting and measuring microbursts and other wind shear hazards.

It is another object of the present invention to provide an improved system for detecting and measuring microbursts and other wind shear hazards.

It is a further object of the present invention to provide a microburst detection and measurement system utilizing small, low cost, low power sensor units which can be easily mounted on existing structures at an airport.

It is yet a further object of the present invention to provide a microburst detection and measurement system having sensors which transmit data concerning the monitored weather conditions to a central data processing unit without use of bulky and cumbersome cable links.

It is one more object of the present invention to provide a microburst detection and measurement system capable of continuous automatic operation without human intervention.

SUMMARY OF THE INVENTION

The invention is a microburst and other wind shear hazard sensing and measuring system comprising an array of sensor/transmitter (SENSTRANS) units disposed about an area to be observed for weather hazards. The SENSTRANS units include sensors for monitoring temperature, pressure, humidity, solar insolation, wind speed and wind direction. Each sensor further includes an analog-to digital converter for converting the sensor outputs into digital form and a microcontroller for combining the data along with housekeeping bits such as parity check bits, identification bits, etc. into a single word. The SENSTRANS units also include RF, frequency modulation transmitters and antennae for transmitting the words to a central data processing and display unit at regular intervals.

The data processing and display unit (DAPAD) includes an antenna and receiver for receiving transmissions from the SENSTRANS units. The received data is forwarded to a microprocessor which assimilates the data and stores it in memory, either tagged or located so as to indicate in addition to the actual data (i.e., the measured value) the sensor from which the data came, and what the data represents. At regular intervals, the microprocessor retrieves the stored data, performs predefined calculations on the data to determine specified parameters such as total pressure, equivalent potential temperature, the time and space differentials of both of these parameters, and other relevant data. If the calculated and/or measured parameters indicate the likely presence of a microburst, then a warning signal is forwarded to the display portion of the DAPAD to indicate the presence and location of the microburst. In a preferred embodiment, the display unit also displays additional information such as some of the measured or calculated values.

DETAILED DESCRIPTION OF THE INVENTION

Figure 1:
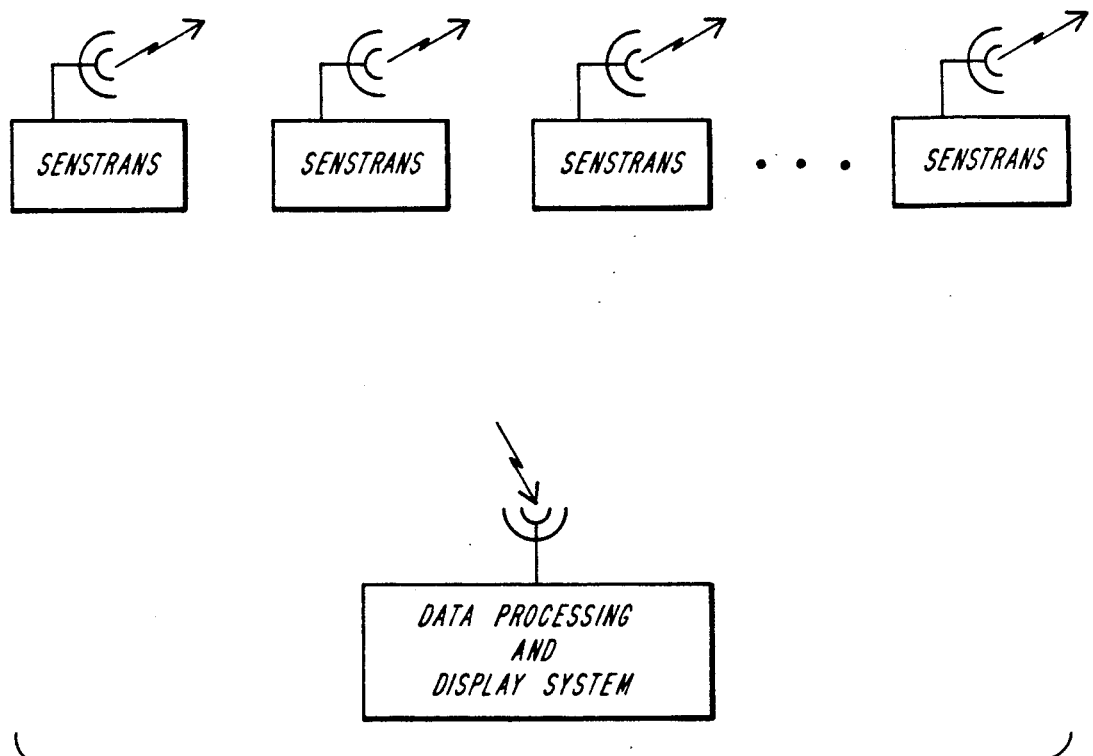
FIG. 1 is a generalized block diagram of the wind shear detection system of the present invention.

The most obvious feature of a microburst which can be used to indicate its presence is a strong divergent flow of wind in a small area. However, there is a substantial body of evidence indicating that strong divergent wind flow alone is an unsatisfactory indicator of microbursts. Divergent wind flow can be caused by phenomena other than microbursts. Therefore an accurate microburst sensor observes other weather parameters in addition to wind speed and direction.

Another indicator of the likely presence of a microburst is the space differential of the total pressure in an area. Total pressure $P_T$ is different from relative barometric pressure which is measured by typical pressure sensors. Total pressure can be calculated as a function of measured pressure and the wind speed (treated as a scalar quantity).

It has been observed that, at the nadir of a vertically incident microburst, the pressure increment over the ambient pressure is given by $$rho \cdot w^2 / 2$$

where
rho is the density of the air, and
w is the speed of the vertically incident downdraft.
As the distance from the nadir increases, the pressure increment defined by the above equation decreases while the speed of the air exiting the microburst increases. As discussed in Fujita, T. T., *The Downburst—Microburst and Macroburst,* Satellite and Mesometeorological Research Project, Department of the Geophysical Sciences, University of Chicago (1985) pp 122, the total pressure increment over ambient in a microburst decreases slowly and near monotonically as the distance from the nadir increases. The total pressure, $P_T$, is the sum of the actual pressure increment over ambient and the pressure derived from the equation above, but where w is the speed of the horizontally moving air. Thus, one can calculate instantaneous total pressure $P_T$ at any location from a relative pressure measurement and horizontal wind speed measurement. One can also calculate the space and time differentials of the total pressure based on a series of measurements of the total pressure, $P_T$, displaced in space and time, respectively.

Thus, in order for a system to gather the information necessary to accurately predict the presence of a microburst, the system should measure not only various weather conditions but measure them at spaced time intervals and at a series of spaced locations and attempt to fit the collected data to the known characteristics of microbursts. For instance, it is known that microbursts tend to be elliptical in shape. Therefore, a reliable microburst sensing system should attempt to fit the observed and or computed data to an ellipse, if possible.

Wolfson, M. M., *Characteristics of Microbursts Observed in The Continental U.S,* preprints 15th Conference on Severe Local Storms, Baltimore, Md., Feb. 22-26, 1988 (American Meteorological Society, Boston) pp 372-379, shows that the new air which accompanies a microburst tends to have a much lower equivalent potential temperature (EPT) than the ambient air, i.e., the air generally present in the observed area before the microburst appears. Moreover, the EPT for a given volume of air remains generally the same for long periods of time, which can be in excess of 24 hours. Therefore, an EPT value for an air mass can be used to "tag" the air mass and uniquely identify it. Thus, a negative value for the time differential of the EPT in an area is a likely indicator of a microburst, since, if new air accompanying a microburst having a lower EPT displaces old air having a higher EPT, the observed EPT in the area will fall. Thus, a rapid decrease of the EPT (i.e. a large, negative differential over time) in a given area is a strong indicator of a microburst.

While the ability to tag air masses by monitoring EPT is clearly advantageous in detecting severe weather phenomena, heretofore little use has been made of EPT measurements, One reason may be that the computation of condensation temperature, $T_c$, which is necessary to calculate EPT has been a tedious task, requiring reference to tables of values or some equivalent. In short, there has been no simple way to compute EPT rapidly and reliably. As will be discussed in more detail herein, the present invention overcomes this particular problem and is believed to be the only meteorological monitoring system which uses EPT to "tag" weather masses.

Figure 2:
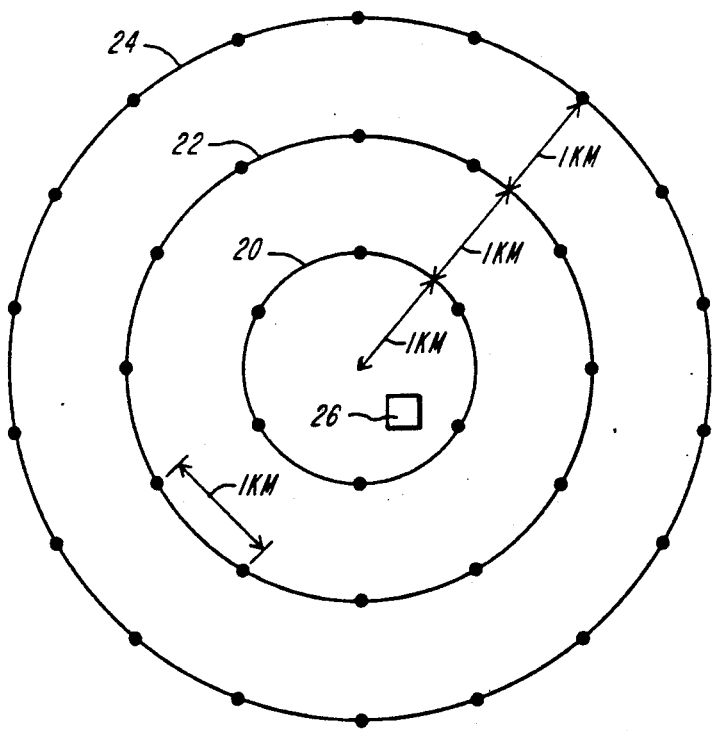
FIG. 2 is a diagram of the currently preferred layout for positioning the SENSTRANS units of the present invention.

FIG. 1 is a simplified block diagram of the various components of the present invention. The system comprises an array of sensor/transmitter (SENSTRANS) units which are physically positioned in the vicinity of an airport. As will be described in greater detail herein, each SENSTRANS unit comprises sensors for sensing temperature, relative barometric pressure, humidity, solar insolation, and wind speed and direction. The number of SENSTRANS units employed at a given airport depends on the size of the airport. The most efficient density of SENSTRANS units is not yet determined. Applicant has tested and been successful in using the present invention with a spacing of approximately 2.5 kilometers between adjacent SENSTRANS units. It is believed that denser spacing will improve accuracy, however, denser SENSTRANS arrays will, of course, increase the cost of the system. In a presently preferred embodiment, SENSTRANS units are positioned at approximately one kilometer intervals in a series of concentric circles as illustrated in FIG. 2. Each dot in FIG. 2 represents a SENSTRANS unit. The innermost circle 20 has a radius of approximately one kilometer and includes six evenly dispersed SENSTRANS units on its circumference such that they are approximately evenly spaced one kilometer from each other. There is also a SENSTRANS unit in the center of the concentric circles. The second circle 22 has a radius of approximately two kilometers and contains approximately twelve SENSTRANS units spaced approximately one kilometer from each other. A third circle 24 has a three kilometer radius and contains approximately eighteen SENSTRANS units spaced approximately one kilometer apart. The approximate total number of SENSTRANS units in succeedingly larger arrays are 1, 7, 19, 37, 61, 91, 127, and 169 for 0, 1, 2, 3, 4, 5, 6 and 7 circles in the the array, respectively. In another preferred embodiment, the SENSTRANS units are arranged in a an hexagonal array. A hexagonal array is preferred because it provides the desired constant distance from-nearest neighbor packing.

As will be described in greater detail herein, each SENSTRANS unit transmits the data to a data processing and display unit (DAPAD) at closely spaced but random intervals by RF transmission. The data processing and display system reads the information from each of the SENSTRANS units and store it in memory. Based on the stored information indicating the various weather parameters at the specified intervals and at the specified locations, the DAPAD calculates at least one of the space and time differentials of the total pressure and the time differential of the equivalent potential temperature (EPT). If the time differential of the EPT exceeds a specified threshold at one or more locations, or if other calculated results indicate the likely presence of a microburst, the DAPAD generates a visual and/or audible signal indicating that a microburst is detected. Preferably, the visual display also indicates, in numerical and/or graphical form, the equivalent potential temperature differential, the intensity of a microburst, its direction of movement, if any, and other selected data. In this manner, the person observing the display can obtain information as to the magnitude of the microburst. In a preferred embodiment, the display also indicates additional parameters such as the wind speeds and directions which would also be useful to the operator in issuing warnings to approaching airplanes.

The data processing and display unit typically will be located in the air traffic control tower where it is available to the air traffic controllers. Preferably there are several secondary display units 57 coupled from the primary data processing and display unit. Thus, there may be a secondary display unit for each controller or in different control towers.

Figure 3:
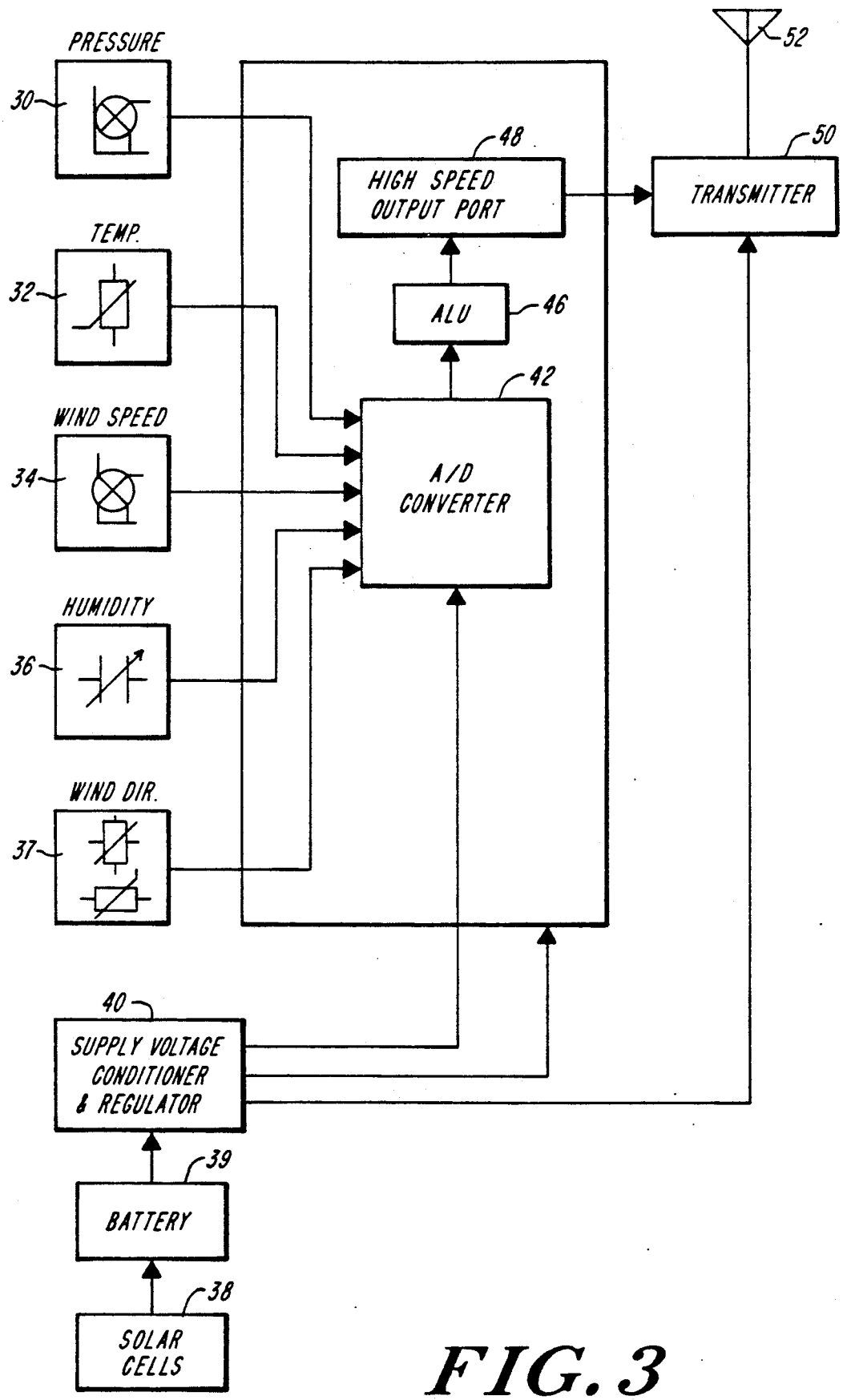
FIG. 3 is a more detailed diagram of a SENSTRANS unit of the present invention.

FIG. 3 shows a more detailed block diagram of a SENSTRANS unit of the present invention. Each SENSTRANS unit includes a relative barometric pressure sensor 30, a temperature sensor 32, a wind speed sensor 34, a humidity sensor 36 and a wind direction sensor 37.

The system of the present invention is intended to be a low cost, turnkey system. Thus, the SENSTRANS units are designed to be approximately the size of a mailbox and to have very low power consumption such that they can be powered by solar cells positioned directly on the unit housing. With such a small size and the only power requirement being exposure to sunlight, the SENSTRANS can be positioned on existing structures at the airport such as light poles, antenna towers, existing LLWAS towers and control towers.

Solid state sensors are used where possible due to their excellent combination of reliability (no or few moving parts), low power consumption, and high accuracy and sensitivity. In a preferred embodiment, the temperature sensor 32 is a negative temperature coefficient resistor (NTC thermister). Small, reliable and accurate solid state pressure and humidity sensors are also widely available on the market and can be adapted for use in the present invention.

Solar insolation is a measurement of the instantaneous level of sunlight in an area. Since the SENSTRANS units are to be solar powered, a measurement of solar insolation can be obtained very simply by monitoring the power output from the solar cells, the power output being proportional to the amount of sunlight striking the solar panels. Since it is known that microbursts appear only in connection with clouds, the measurement of solar insolation can be used to check the other indicators of microbursts. If other weather conditions indicate the possible presence of a microburst but the solar insolation at a surrounding array of SENSTRANS units indicates bright sunlight (i.e. no clouds) then no microburst warning will be generated.

Wind speed, as a scalar quantity, is also measured. In a preferred embodiment, the wind speed sensor 34 can be a pressure sensor similar to the pressure sensor 30 in combination with a wind speed sensing device similar to the one disclosed in Bedard, A. J. Jr. and Fujita, T. T., *An Omnidirectional, Tilt Insensitive Wind Speed Threshold Detector*, Preprints Fourth Symposium On Meteorological Observations And Instrumentation, Apr. 10–14, 1978 (American Meteorological Society, Boston) pp 83–86.

Solar panels 38 provide power to a battery 39 for powering the SENSTRANS. The output of the battery 39 is conditioned by a voltage conditioner and regulator 40. The output of the voltage conditioner and regulator 40 drives the hardware of the SENSTRANS unit.

The outputs of the pressure sensor 30, the temperature sensor 32, the wind speed sensor 34 humidity sensor 36, and wind direction sensor 37 are provided to analog-to-digital converter (ADC) 42. The output of the voltage conditioner and regulator 40 is also sent to the ADC 42 as a measure of solar insolation. The output of the ADC 42 is forwarded to an arithmetic logic unit (ALU) 46 at random intervals. The ALU combines the data from the sensors with housekeeping data such as parity bits, SENSTRANS unit identification bits and transmission protocol information, performs a modulator function at a standard baud rate and forwards this to an output port 48.

The output port performs a modulator function at a standard baud rate and forwards the digital information to transmitter 50. Transmitter 50 frequency modulates the digital data and forwards it to a transmitting antenna 52. Each SENSTRANS unit transmits its data asynchronously in a FM transmission at approximately 400 megahertz. Each packet consists of a preamble, identification code, temperature, humidity, pressure, wind speed, solar insolation, power supply voltage (solar insolation), parity check, and postamble. The transmission rate may be any one of the standard commercial rates. Each SENSTRANS unit transmits once in sequential fixed time blocks, but at random times within each block. The exact RF system frequency will depend o frequency allocations in the area. Each SENSTRANS unit transmits at the same frequency. Alternately, a repeater or several repeaters can be used.

Figure 4:
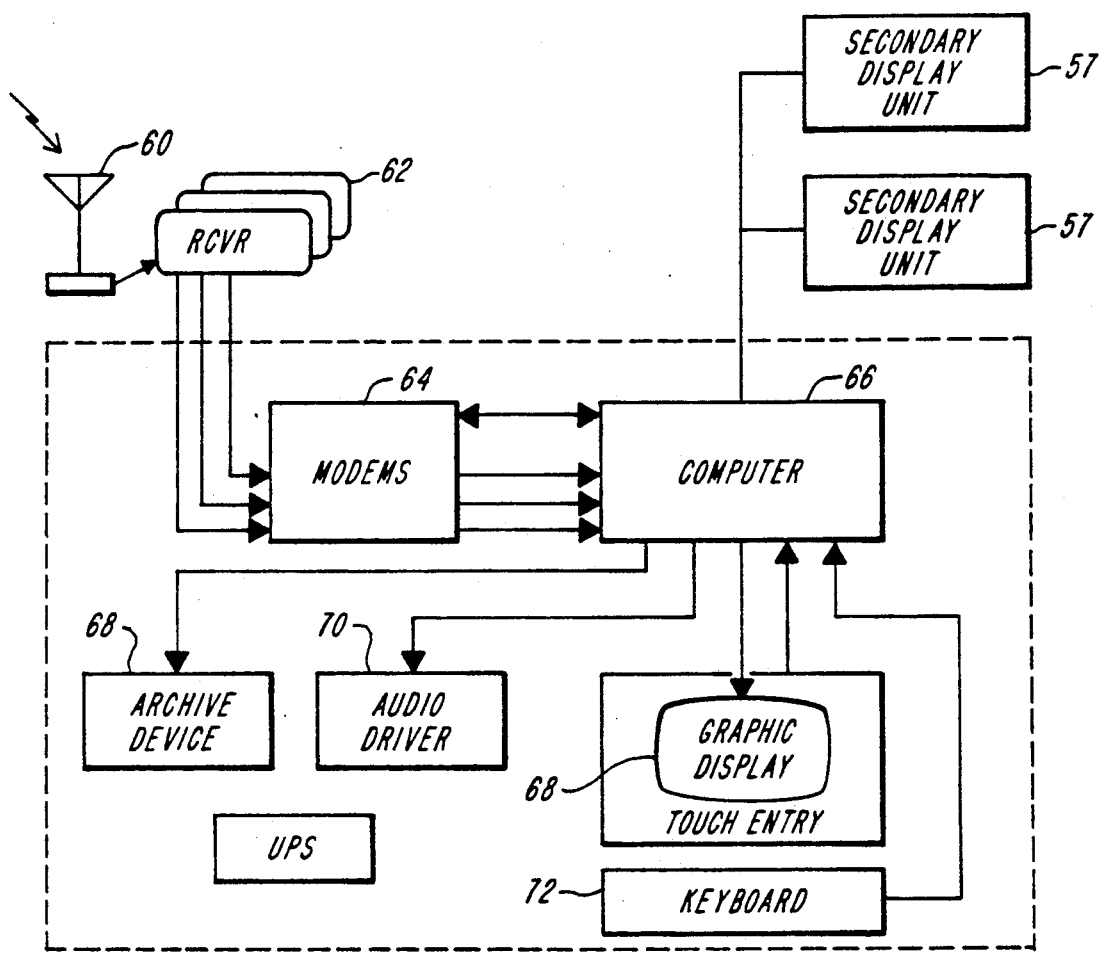
FIG. 4 is a more detailed block diagram of the data processing and display unit of the present invention.

The data processing an display unit (DAPAD) is illustrated in block diagram form in FIG. 4. An antenna 60 receives transmissions from the SENSTRANS units and forwards the data to receiver 62. The receiver 62 converts the received signals to a form which can be demodulated by modems 64. The demodulated information is fed to a processing unit 66. The processing unit 66, checks parity, separates the received data word into its individual components (e.g., temperature value, humidity value, etc), identifies the transmitting SENSTRANS unit, applies conversion constants where necessary to place the data in appropriate units, and stores the data in memory 68. This process is repeated as each SENSTRANS unit transmits its information to the DAPAD.

At specified intervals, the processing unit 66 in the DAPAD performs predetermined algorithms on the data to calculate the likely presence of a microburst. For instance, as discussed above, a strong, divergent air flow at various SENSTRANS units is indicative of the presence of a microburst. Thus, for instance, the processing unit can compare the wind flow and direction readings at various SENSTRANS units to determine if there is a strong, divergent wind flow pattern.

Also, since it is known that the total pressure in a microburst decreases slowly and monotonically as distance from the nadir increases, the system should also calculate the total pressure and the space differential of the total pressure. It is also known that the total pressure in an area occupied by a microburst also increases slowly and monotonically. Thus, the time differential of the total pressure should be calculated in addition. Total pressure can be easily calculated by use of known algorithms as a function of the relative pressure measured by sensor 30 and the wind speed measured by sensor 34.

Further, as noted previously, a rapid decrease in EPT is also a likely indicator of microbursts. The processing unit 66 can determine the time differential of the equivalent potential temperature based on the stored information gathered from the various SENSTRANS units. Instantaneous equivalent potential temperature (EPT) is given by the following equation:

$$EPT = \left(T_c + \frac{L_c w}{C_p}\right)\frac{P_0}{P_c}$$

where:
EPT = equivalent potential temperature,
$T_c$ = condensation temperature,
$L_c$ = latent heat of vaporization of water,
$C_p$ = specific heat of dry air at a constant pressure,
W = grams of water vapor per gram of dry air
$P_0$ = standard pressure of 1000 millibar, and
$P_c$ = pressure at the condensation level.

$L_c$, $C_p$ and $P_0$ are constants for a given geographical area. Therefore, in order to calculate instantaneous EPT, the processing unit must calculate (1) the condensation temperature $T_c$, (2) the grams of water vapor per gram of dry air, W, and (3) the pressure at the condensation level, $p_c$. W and $P_c$ can be calculated from the collected data by known algorithms. However, as noted previously, the calculation of $T_c$ has, heretofore, been prohibitively time consuming and difficult. The present invention, however, utilizes the equation below to calculate condensation temperature, $T_c$.

$$T_c = (aT^2 + bT + c)(\log_{10}VP)^2 + (dT^2 + eT + f)\log_{10}VP + gT^2hT + i$$

where
T = temperature in °K. (between 0 and 40 deg. C.)
$T_c$ = condensation temperature in °K.
VP = vapor pressure
and
a through i are constants, which, for instance, at Stapleton, Colo. (approximate elevation of 6000 feet) are as follows:
a = 0.00049954
b = −0.20004
c = 22.68
d = 0.00375621
e = 1.959
f = −225.25
g = 0.0035074
h = −2.1116
i = 561.77

Temperature, T, in the above equation is obtained from the temperature sensor. Vapor pressure, VP, can also be determined from the parameters measured by the sensors by algorithms well known in the prior art. Thus, by use of the above equation, the equivalent potential temperature, EPT, can be determined reasonably quickly by a microprocessor based processing unit. The time differential of the EPT can also be determined.

Since EPT for a given volume of air is constant for long periods of time, and the air which accompanies a microburst tends to have a much lower EPT than the ambient air, microbursts (or any other air mass having a distinct EPT from the surrounding environment) can be tagged and tracked by the system of the present invention. Thus, the present invention not only can be used to detect microbursts but it can also be adapted to track microbursts an determine in what direction and at what rate of speed they are moving. This information can be provided to pilots who can then avoid the path of a microburst.

The processing unit can perform any number of calculations and computations to determine the likely presence of a microburst. Heretofore, no single measurement or set of measurements has been agreed upon as being most indicative of the presence of microbursts. However, the simultaneous detection of a strong divergent wind flow, rapid decrease in EPT (i.e., high negative time differential), and a slowly and monotonically decreasing total pressure as distance from a central point increases (i.e., a low value, negative, approximately linear space differential as discussed above), are reliable indicators of microbursts. Thus, in the preferred embodiment, the processing unit calculates at least these values. Further, in a preferred embodiment, the processing unit attempts to fit the total pressure space differential to a non-reentrant and non concave shape, preferably an elliptical pattern, of slowly and monotonically decreasing total pressure as distance from a central point increases. (The term "non reentrant" refers to a shape having no voids within the perimeter of the shape). Even more preferably, the processing unit also calculates and attempts to fit both the total pressure and the absolute value of the EPT change in the short term (10 to 30 minutes) to a non reentrant and non-concave shape (preferably elliptical) of slowly and monotonically decreasing value as distance from a central point increases.

In any event, the desired calculations are performed at regular intervals and each result is compared to a specified maximum or minimum limit. If any one or a combination of the calculated results exceeds or falls below the corresponding maximum or minimum limits, respectively, or if the data fits one or more of the expected elliptical microburst patterns, the DAPAD issues a weather hazard warning signal to a graphic display unit 68 as well as an audio unit 70 which generate visual and audio signals, respectively, indicating the presence of a microburst. However, if the solar insolation measurements exceed a specified minimum threshold selected to indicate the absence of cloud cover in the same region, then the processing unit suppresses the weather hazard warning signal since it can be assumed that a microburst does not exist where there are no clouds nearby.

Depending upon the sophistication of the computations performed and on the graphic display unit 68, the display unit 68 may also display one or more of the measured values and/or calculated results as well as indicate the likely position of the microburst. In this manner, the air traffic controller or other observer of the display can make a value judgment as to the intensity of the microburst and/or the likelihood of the accuracy of the warning.

In a preferred embodiment, the system further includes one or more secondary display units 57 so that several air traffic controllers or other users can have simultaneous access to the system.

In a preferred embodiment, a keyboard 72 is provided and the processing unit 66 includes programming which allows the operator of the DAPAD to communicate with the processing unit. For instance, the programming may allow the operator to request certain data to be displayed and/or to request certain calculations to be performed.

Figure 5:
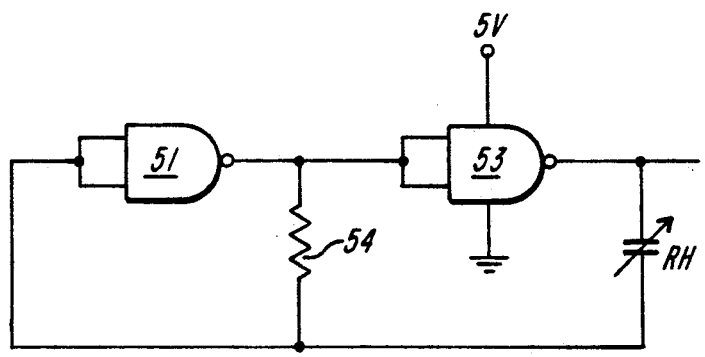
FIG. 5 is a circuit diagram of the oscillator for the solid state humidity sensor of the present invention.

FIG. 5 shows a more detailed diagram of the humidity sensor of the present invention. Various commercial, solid state, capacitive, relative humidity sensors are available on the market due to their wide use in clothes driers, air conditioners, climate controllers and humidifiers. One particular exemplary solid state humidity sensor is the Phillips 2322 691 90001 capacitive humidity sensor (hereinafter simply the Phillips humidity sensor).

The Phillips humidity sensor, like most solid state humidity sensors, must be driven by an electronic oscillator. FIG. 5 illustrates the humidity sensor drive oscillator of the present invention. The humidity sensor is shown at 36. The oscillator comprises two CMOS NAND gates 51 and 53 and a single resistor 54. The output of NAND gate 51 is coupled to the inputs of NAND gate 53. The output of NAND gate 53 is coupled to one terminal of the humidity sensor 36, which is a variable capacitor humidity sensor. The other terminal of sensor 36 is coupled to the input of NAND gate 51. The resistor 54 is coupled between the output of NAND gate 51 and the sensor 36. Each SENSTRANS unit includes a circuit board and associated electronic circuitry as shown in FIG. 3. The addition of two CMOS NAND gates and a resistor requires nominal additional power and space requirements and thus allows for a very low cost, low overhead and low power oscillator for driving the humidity sensor.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A weather hazard detection apparatus comprising:
   a plurality of SENSTRANS units positioned at spaced intervals in an area in which weather hazards are to be detected, each SENSTRANS unit including:
   a humidity sensor,
   a wind speed sensor,
   a wind direction sensor,
   a barometric pressure sensor,
   a temperature sensor, and
   means for transmitting measurement values from said sensors via RF transmission at predetermined intervals,
   a data processing and display unit (DAPAD), said DAPAD comprising,
   means for receiving said measurement values transmitted by said SENSTRANS units,
   means for storing said values along with an identification of the particular SENSTRANS unit from which it originated and the time period in which it was measured,
   a data processing unit for manipulating said stored measurement values to calculate parameters indicative of the presence or absence of weather hazards, said manipulations including, at least, calculation of the time differential of the equivalent potential temperature for at least one point in said area,
   said DAPAD further including means for generating a warning signal responsive to one or more of said calculated parameters falling within corresponding predefined ranges indicative of the likely presence of a weather hazard, and
   display means responsive to said warning signal for producing a display indicating the presence of a weather hazard.

2. An apparatus as set forth in claim 1 wherein said SENSTRANS units are spaced at approximately one kilometer intervals.

3. An apparatus as set forth in claim 2 wherein said SENSTRANS units are disposed on concentric circles within said area.

4. An apparatus as set forth in claim 1 wherein said sensors are electronic and each of said SENSTRANS units further comprises analog-to-digital converting means between said sensors and said transmitting means for converting said measurement values into digital form.

5. An apparatus as set forth in claim 4 wherein each SENSTRANS unit further comprises microprocessor means between said analog-to-digital converting means and said transmitting means for combining said digital measured values with a SENSTRANS identification code, a parity check code, and transmission protocol data, to form a data word for transmission to said DAPAD.

6. An apparatus as set forth in claim 1 wherein each SENSTRANS unit further includes a solar insolation sensor and wherein said processing unit includes means for suppressing said display which indicates the presence of a weather hazard if the measurement from said solar insolation sensor exceeds a predefined threshold.

7. An apparatus as set forth in claim 6 wherein each of said SENSTRANS units is solar powered and comprises solar cells and wherein said solar insolation sensor monitors the power output of said solar cells.

8. An apparatus as set forth in claim 1 wherein said processing unit further calculates the total pressure and the time differential of the total pressure at each SENSTRANS unit.

9. An apparatus as set forth in claim 8 wherein said processing unit further calculates the space differential of the total pressure in said area based on the total pressure calculated at a plurality of said SENSTRANS units.

10. An apparatus as set forth in claim 9 wherein said processing unit attempts to fit said total pressure values from said SENSTRANS units to a non-reentrant and non concave shape in which said total pressure decreases slowly and monotonically as the distance from the center of said shape increases and, if said attempt is successful, causing said generating means to generate said warning signal.

11. An apparatus as set forth in claim 10 wherein said processing unit attempts to fit said wind speed and wind direction values from said SENSTRANS units to a pattern of strong winds diverging from a central point and, if said attempt is successful, causing said generating means to generate said warning signal.

12. An apparatus as set forth in claim 9 wherein said processing unit calculates the total pressure change in the short term and attempts to fit said total pressure change in the short term to a non-reentrant and non-concave pattern in which said total pressure change decreases slowly and monotonically as the distance from the center of said shape increases and, if said attempt is successful, causing said generating means to generate said warning signal.

13. An apparatus as set forth in claim 9 wherein said processing unit calculates the absolute value of the equivalent potential temperature change and attempts to fit said absolute value of said equivalent potential temperature change to a non-reentrant and non-concave pattern in which said equivalent potential temperature decreases slowly and monotonically as the distance from the center of said shape increases and, if said attempt is successful, causing said generating means to generate said warning signal.

14. An apparatus as set forth in claim 1 wherein said DAPAD further includes means for producing an audible weather hazard warning in response to said warning signal.

15. An apparatus as set forth in claim 1 further comprising an electronic oscillator for driving said humidity sensor, said oscillator comprising,
first and second CMOS NAND gates, each having first and second inputs and an output, said output of said first NAND gate coupled to said first and second inputs of said second NAND gate, and said output of said second NAND gate coupled to a first terminal of said humidity sensor, a second terminal of said humidity sensor coupled to said first and second inputs of said first NAND gate, and
a resistor having first and second terminals, said first terminal coupled to said output of said first NAND gate and said second terminal coupled to said first and second inputs of said first NAND gate.

16. An apparatus as set forth in claim 1 wherein said temperature sensor is a negative temperature coefficient resistor.

17. An apparatus as set forth in claim 1 further comprising a plurality of secondary display units responsive to said microburst warning signal for generating displays indicating the location of a microburst.

18. An apparatus as set forth in claim 1 wherein said equivalent potential temperature is calculated by the equation:

$$EPT = \left(T_c + \frac{L_c w}{C_p}\right)\frac{P_0}{P_c}$$

where:
EPT = equivalent potential temperature,
$T_c$ = condensation temperature,
$L_c$ = latent heat of vaporization of water,
$C_p$ = specific heat of dry air at a constant pressure,
W = grams of water vapor per gram of dry air
$P_0$ = standard pressure, and
$P_c$ = pressure at the condensation level.

and further wherein $T_c$ is calculated by the equation:

$$T_c = (aT^2 + bT + c)(\log_{10}VP)^2 + (dT^2 eT + f)\log_{10}VP + gT^2 + hT + i$$

where:
T = temperature in °K. (between 0 and 40 deg. C.)
$T_c$ = condensation temperature in °K.
VP = vapor pressure
and
a = 0.0049954
b = −0.20004
c = 22.68
d = 0.00375621
e = 1.959
f = −225.25
g = 0.0035074
h = −2.1116
i = 561.77

19. A microburst detection apparatus comprising:
a plurality of SENSTRANS units positioned about an area in which weather hazards are to be detected, each SENSTRANS unit comprising;
a solar insolation sensor,
a humidity sensor,
a wind speed sensor,
a wind direction sensor,
a barometric pressure sensor,
a temperature sensor,
an analog-to-digital converter having inputs coupled to receive measurement values from said sensors and an output, said analog-to-digital converter converting said measurement values into a digital measurement word,
( a microprocessor for combining said digital measurement word with parity check bits, SENSTRANS unit identification bits and transmission protocol bits to produce a digital transmission word,
a transmitter for transmitting said transmission word via RF transmission to specified intervals,
said apparatus further comprising a data processing and display unit (DAPAD), said DAPAD comprising, a receiver for receiving said transmission words from said SENSTRANS units, a processing unit including means for disassembling said transmission words into data packets, each packet disclosing the measured value, the weather condition represented by the measured value, the time the measurement was made, and the SENSTRANS unit from which the measurement was received, a memory storage device for storing said data packets, said processing unit further comprising means for calculating the total pressure at each SENSTRANS unit, the time differential of the equivalent potential temperature at one or more of the SENSTRANS units, and the relative wind speeds and directions at the SENSTRANS units, and means for determining the likely presence and location of a microburst based on said calculations, means for generating a microburst warning signal in said processing unit when said calculations indicate the likely presence of a microburst, visual display means responsive to said microburst warning signal for producing a display indicating the location and magnitude of the microburst, and audio means for generating an audible warning signal responsive to said microburst warning signal.

20. An apparatus as set forth in claim 19 further comprising a plurality of secondary display units responsive to said microburst warning signal for generating displays indicating the location of a microburst.

21. An apparatus as set forth in claim 20 wherein said processing unit includes means for suppressing said microburst warning signal if the measurement from said solar insolation sensor exceeds a predefined threshold.

22. An apparatus as set forth in claim 21 wherein each of said SENSTRANS units is solar powered and comprises solar cells and wherein said solar insolation sensor monitors the power output of said solar cells.

23. An apparatus as set forth in claim 22 wherein said SENSTRANS units are positioned above the ground.

24. An apparatus as set forth in claim 23 wherein said processing unit attempts to fit said total pressure values from said SENSTRANS units to an elliptical pattern in which said total pressure decreases slowly and monotonically as the distance from the center of said elliptical pattern increases and, if said attempt is successful, causing said generating means to generate said warning signal.

25. An apparatus as set forth in claim 24 wherein said processing unit calculates the total pressure change over the short term and attempts to fit said total pressure change over the short term to a non-reentrant and non-concave pattern in which said total pressure change decreases slowly and monotonically as the distance from the center of said shape increases and, if said attempt is successful, causing said generating means to generate said warning signal.

26. An apparatus as set forth in claim 24 wherein said processing unit calculates the absolute value of the equivalent potential temperature change and attempts to fit said absolute value of said equivalent potential temperature change to a non-reentrant and non-concave pattern in which said equivalent potential temperature decreases slowly and monotonically a the distance from the center of said shape increases and, if said attempt is successful, causing said generating means to generate said warning signal.

27. An apparatus as set forth in claim 23 wherein said processing unit attempts to fit said wind speed and wind direction values from said SENSTRANS units to a pattern of strong winds diverging from a central point and, if said attempt is successful, causing said generating means to generate said warning signal.

28. An apparatus as set forth in claim 27 further comprising an electronic oscillator for driving said humidity sensor, said oscillator comprising, first and second NAND gates, each having first and second inputs and an output, said output of said first NAND gate coupled to a first terminal of said sensor, a second terminal of said humidity sensor coupled to said first and second inputs of said second NAND gate, and said output of said second NAND gate coupled to said first and second inputs of said first NAND gate, and a resistor having first and second terminals, said first terminal coupled to said output of said first NAND gate and said second terminal coupled to said output of said second NAND gate.

29. An apparatus as set forth in claim 19 wherein said equivalent potential temperature is calculated by the equation:

$$EPT = \left(T_c + \frac{L_c w}{C_p}\right)\frac{P_0}{P_c}$$

and further wherein $T_c$ is calculated by the equation:

$$T_c = (aT^2 + bT + c)(\log_{10} VP)^2 + (dT^2 + eT + f)\log_{10} VP + gT^2 + hT = i$$

where
  $T$ = temperature in °K. (between 0 and 40 deg. C.)
  $T_c$ = condensation temperature in °K.
  $VP$ = vapor pressure
and
  $a = 0.00049954$
  $b = -0.20004$
  $c = 22.68$
  $d = 0.00375621$
  $e = 1.959$
  $f = -225.25$
  $g = 0.0035074$
  $h = -2.1116$
  $i = 561.77$.

* * * * *